US012645231B2

(12) United States Patent
Hammarstrom

(10) Patent No.: US 12,645,231 B2
(45) Date of Patent: Jun. 2, 2026

(54) DETECTION OF SLIP BETWEEN A SELF-PROPELLED ROBOTIC TOOL AND A GRASS SURFACE

(71) Applicant: HUSQVARNA AB, Huskvarna (SE)

(72) Inventor: Martin Hammarstrom, Jonkoping (SE)

(73) Assignee: HUSQVARNA AB, Huskvarna (SE)

( * ) Notice: Subject to any disclaimer, the term of this patent is extended or adjusted under 35 U.S.C. 154(b) by 75 days.

(21) Appl. No.: 18/661,114

(22) Filed: May 10, 2024

(65) Prior Publication Data

US 2024/0377845 A1     Nov. 14, 2024

(30) Foreign Application Priority Data

May 11, 2023    (SE) .................................... 2350577-9

(51) Int. Cl.
| | |
|---|---|
| *G05D 1/86* | (2024.01) |
| *A01D 34/00* | (2006.01) |
| *A01D 69/02* | (2006.01) |
| *A01D 101/00* | (2006.01) |
| *G05D 107/20* | (2024.01) |

(52) U.S. Cl.
CPC ............. *G05D 1/86* (2024.01); *A01D 34/008* (2013.01); *A01D 69/02* (2013.01); *A01D 2101/00* (2013.01); *G05D 2107/23* (2024.01)

(58) Field of Classification Search
CPC .... G05D 1/86; G05D 2017/23; A01D 34/008; A01D 69/02; A01D 2101/00
USPC ........................................................ 701/23
See application file for complete search history.

(56) References Cited

U.S. PATENT DOCUMENTS

| | | | |
|---|---|---|---|
| 2008/0154429 A1 | 6/2008 | Lee et al. | |
| 2009/0157227 A1 | 6/2009 | Park et al. | |
| 2014/0330496 A1 | 11/2014 | Crouse et al. | |
| 2019/0239428 A1* | 8/2019 | Levin ................... | A01D 34/008 |
| 2019/0357430 A1* | 11/2019 | Kraft ................... | G05D 1/0088 |
| 2019/0378360 A1* | 12/2019 | Bergenholm ........ | G05D 1/0088 |
| 2021/0112708 A1* | 4/2021 | Kameyama .......... | G05D 1/0088 |
| 2021/0161065 A1 | 6/2021 | Holgersson | |
| 2021/0176915 A1* | 6/2021 | Vines ................... | G05D 1/0225 |

(Continued)

FOREIGN PATENT DOCUMENTS

EP            3695700 A1     8/2020

OTHER PUBLICATIONS

Swedish Office Action and Search Report for Swedish Application No. 2350577-9, Mailed on Dec. 12, 2023.

*Primary Examiner* — Erin M Piateski
*Assistant Examiner* — Brian K Palmarchuk
(74) *Attorney, Agent, or Firm* — Burr & Forman

(57) ABSTRACT

A method of detecting slip between a self-propelled robotic tool and a grass surface comprises: driving on the grass surface; based on a desired heading and speed of the self-propelled robotic tool, generating a first drive signal for a first drive wheel of the self-propelled robotic tool; generating a time-variant drive signal pattern overlay; applying said time-variant drive signal pattern overlay to said first drive signal to form a first wheel control signal; operating a first drive wheel based on said first wheel control signal; receiving a movement signal from a movement detector; and determining a slip state based on an identification of said time-variant drive signal pattern overlay in said movement signal.

16 Claims, 5 Drawing Sheets

(56)                References Cited

U.S. PATENT DOCUMENTS

| | | | |
|---|---|---|---|
| 2021/0289695 A1* | 9/2021 | Grufman | G05D 1/0055 |
| 2022/0055626 A1* | 2/2022 | Gariepy | B60T 8/175 |
| 2022/0402736 A1* | 12/2022 | Zahdeh | G05D 1/65 |

\* cited by examiner

98

DETECTION OF SLIP BETWEEN A SELF-PROPELLED ROBOTIC TOOL AND A GRASS SURFACE

FIELD OF THE INVENTION

The present invention relates to a method of detecting slip between a self-propelled robotic tool and a grass surface. The invention further relates to a self-propelled robotic tool, as well as data processing equipment, configured to carry out the method, along with a computer program product implementing the method and a computer-readable storage medium storing the computer program product.

BACKGROUND

Self-propelled robotic tools such as robotic lawnmowers autonomously operate unattended within a work area. It may happen that such a robotic tool gets stuck at an obstacle. If the wheels keep on spinning, the grass surface may be damaged. For this and other reasons, most robotic lawnmowers are provided with sensors for detecting collisions and/or wheel slip. There are various known methods for detecting the wheel slip of a robotic lawnmower. For example, US 2014/330496 A1 suggests that wheel slippage can be detected based on the drive current to a drive wheel falling below a certain value.

A problem with the method of US 2014/330496 A1 is that it does not work very well in situations where the friction between grass and drive wheels is intrinsically low. This may be the case for e.g. low-weight robotic lawnmowers, for lawnmowers driving on wet grass, or if wheels having smooth or fine-patterned rolling surfaces, intended for delicate grass surfaces, are used. This can in principle be addressed by adding dead weight to the lawnmowers. However, adding weight is not a satisfactory solution, because it increases the energy consumption of the robotic lawnmower. As the robotic lawnmower market matures, there is also a trend towards less complex and less expensive robotic lawnmowers.

SUMMARY

It is an object of the present invention to solve, or at least mitigate, parts or all of the above mentioned problems. To this end, there is provided a method of detecting slip between a self-propelled robotic tool and a grass surface, comprising: driving on the grass surface; based on a desired heading and speed of the self-propelled robotic tool, generating a first drive signal for a first drive wheel of the self-propelled robotic tool; generating a time-variant drive signal pattern overlay; applying said time-variant drive signal pattern overlay to said first drive signal to form a first wheel control signal; operating a first drive wheel based on said first wheel control signal; receiving a movement signal from a movement detector; and determining a slip state based on an identification of said time-variant drive signal pattern overlay in said movement signal. Using this method, wheel slip can be detected regardless of the slip friction between drive wheels and grass. In particular, it works well for low-weight robotic tools, and thereby permits a reduction in weight, cost and complexity of such robotic tools, as well as an ensuing reduction of power consumption. It also works well for other situations where friction between drive wheels and grass is low. The time-variant drive signal pattern overlay may, for example, be a repetitive signal such as a periodic signal of a set frequency. The identification may, for example, be made by using a band-pass filter with its pass band at the set frequency. The set frequency may be predetermined; alternatively, it may be dynamically set, and the pass band of the band pass filter may be dynamically adjusted accordingly. According to further examples, the time-variant drive signal pattern overlay may comprise consecutive velocity ramps of opposite signs, and the identification of the time-variant drive signal pattern overlay may comprise the identification of consecutive sets of accelerations and decelerations. According to still further examples, the time-variant drive signal pattern overlay may comprise a step function, and the identification may comprise the identification of a corresponding acceleration or retardation peak. In fact, the time-variant drive signal pattern overlay may have any other suitable pattern, and may be identified using any other suitable signal identification technique, such as a trained classifier trained on the specific pattern. The time-variant drive signal pattern overlay may be predetermined; alternatively, it may be generated based on a predetermined algorithm. Still alternatively, it may be void of any specific predetermined character, for example using a random function. In the latter case, the identification of the time-variant drive signal pattern overlay in said movement signal may be based on a comparison with a stored copy of the time-variant drive signal pattern overlay. The slip state may be binary, its binary values corresponding to "slip detected" and "slip not detected". Alternatively, the slip state may be represented as a probability or likelihood that the self-propelled robotic tool is slipping.

According to embodiments, the method may further comprise: based on said desired heading and speed of the self-propelled robotic tool, generating a second drive signal for a second drive wheel of the self-propelled robotic tool; applying a time-variant drive signal pattern overlay to said second drive signal to form a second wheel control signal; and operating a second drive wheel based on said second wheel control signal. The time-variant drive signal pattern overlay applied to the second drive signal for the second drive wheel may be the same as the time-variant drive signal pattern overlay applied to the first drive signal for the first drive wheel. Alternatively, it may be different. Accordingly, the generation of a time-variant drive signal pattern overlay may comprise generating a first time-variant drive signal pattern overlay for the first drive signal and generating a second, different, time-variant drive signal pattern overlay for the second drive signal, and the determination of a slip state may be based on an identification, in said movement signal, of a first time-variant drive signal pattern overlay applied to the first drive signal and a second time-variant drive signal pattern overlay applied to the second drive signal.

According to embodiments, the method may comprise applying the same time-variant drive signal pattern overlay to each of said first and second drive signals. Thereby, identification of the time-variant drive signal pattern overlay in the movement signal may be facilitated. According to embodiments, the time-variant drive signal pattern overlay applied to the first drive signal may be in phase with the time-variant drive signal pattern overlay applied to the second drive signal. Such a method results in time-variant deviations of the self-propelled robotic tool's speed and acceleration only. Such deviations are more difficult for a person to see, which reduces the risk that a user of the self-propelled robotic tool thinks that there is a problem with the self-propelled robotic tool's behaviour. Alternatively, the time-variant drive signal pattern overlay applied to the first drive signal may be out of phase with the time-variant drive signal pattern overlay applied to the second drive signal. This results in a change of the self-propelled robotic tool's heading. Such changes are easy to detect, which may facilitate the determination of a slip state based on an identification of the time-variant drive signal pattern overlay in the movement signal.

According to embodiments, the time-variant drive signal pattern overlay of the first wheel control signal may be different from any time-variant drive signal pattern overlay of any second wheel control signal. Such an embodiment results in time-variant deviations of the self-propelled robotic tool's heading. According to some embodiments, different time-variant drive signal pattern overlays may be applied to different drive signals destined for different drive wheels. According to other embodiments, a time-variant drive signal pattern overlay is applied to a single drive signal, destined for a single drive wheel, only.

According to embodiments, a determination that the self-propelled robotic tool is slipping is based on a further condition that no lift has been detected. Lift may be detected by e.g. separate lift sensors, by detecting a vertical acceleration, or by any other suitable method.

According to embodiments, the method may further comprise: determining a drive wheel rotation resistance; comparing the drive wheel rotation resistance to a reference resistance value; and based on said comparison, determining that the self-propelled robotic tool has not been lifted. Thereby, lift events, at which the drive wheel rotation resistance is low, can easily be distinguished from slip events, at which the drive wheel rotation resistance is higher due to slipping contact with the ground. The drive wheel rotation resistance may be represented by a wheel drive motor current for turning the drive wheel. The reference resistance value may be predetermined. Alternatively, it may be dynamically set. For example, the reference resistance value may be set based on the inclination of the ground upon which the self-propelled robotic tool operates.

According to embodiments, said time-variant drive signal pattern overlay alternates between positive and negative values. Thereby, said time-variant drive signal pattern overlay does not, over time, result in a substantial drift of the path from an intended path corresponding to said first drive signal. According to embodiments, an average value of said time-variant drive signal pattern overlay, over time, is about zero.

According to embodiments, said time-variant drive signal pattern overlay varies with a frequency of between 0.1 Hz and 100 Hz. Such a frequency range is well adapted to the dynamics of a self-propelled robotic tool such as a robotic lawnmower, and results in a movement signal which is easy to detect. The frequency may be constant or variable.

According to embodiments, a magnitude of the time-variant drive signal pattern overlay is less than 20% of a magnitude of the first drive signal. Thereby, the behaviour of the self-propelled robotic tool will not look erratic to an observer. The magnitude may, for example, correspond to a certain drive current level. According to further embodiments, the magnitude of the time-variant drive signal pattern overlay may be less than 10% of a magnitude of the first drive signal.

According to embodiments, said movement detector comprises at least one of an accelerometer, a gyroscope, and a magnetometer. Preferably, the movement detector may comprise two or more different ones of the mentioned kinds of sensors. The sensors may be integrated into an inertial measurement unit, IMU.

According to embodiments, the method may further comprise: in response to having determined that the self-propelled robotic tool is slipping, reversing a rotation direction of said first drive wheel. Thereby, the self-propelled robotic tool will reverse or turn away from any obstacle that may have caused the slip. The rotation direction of any second drive wheel may also be rotated.

According to a second aspect, there is provided data processing equipment comprising at least one processor and memory, configured to carry out the method as defined in any of the embodiments hereinabove.

According to a third aspect, there is provided a self-propelled robotic tool comprising: a first drive wheel; a first drive wheel motor configured to rotate said first drive wheel; a movement detector; and data processing equipment as defined hereinabove.

According to embodiments, the self-propelled robotic tool further comprises a second drive wheel and, in addition to the first and second drive wheels, at least one further wheel configured to roll on the grass surface, wherein all of said first and second drive wheels and said at least one further wheel are carried by a single, rigid chassis. Low-weight lawnmowers are usually of the aforesaid single-chassis type, whereby all wheels are mounted to the same rigid chassis, and thereby particularly benefit from the slip detection methods defined herein.

According to embodiments, the self-propelled robotic tool has a weight of less than 9.0 kg. According to further embodiments, the self-propelled robotic tool has a weight of less than 7.0 kg; according to still further embodiments, the self-propelled robotic tool weighs 5.5 kg or less.

According to a fourth aspect, there is provided a computer program product comprising instructions which, when the program is executed on a processor, carries out the method as defined in any of the embodiments hereinabove.

According to a fifth aspect, there is provided a computer-readable storage medium having stored thereon the computer program product defined hereinabove.

It is noted that embodiments of the invention may be embodied by all possible combinations of features recited in the claims. Further, it will be appreciated that the various embodiments described for the device are all combinable with the method as defined in accordance with the second aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
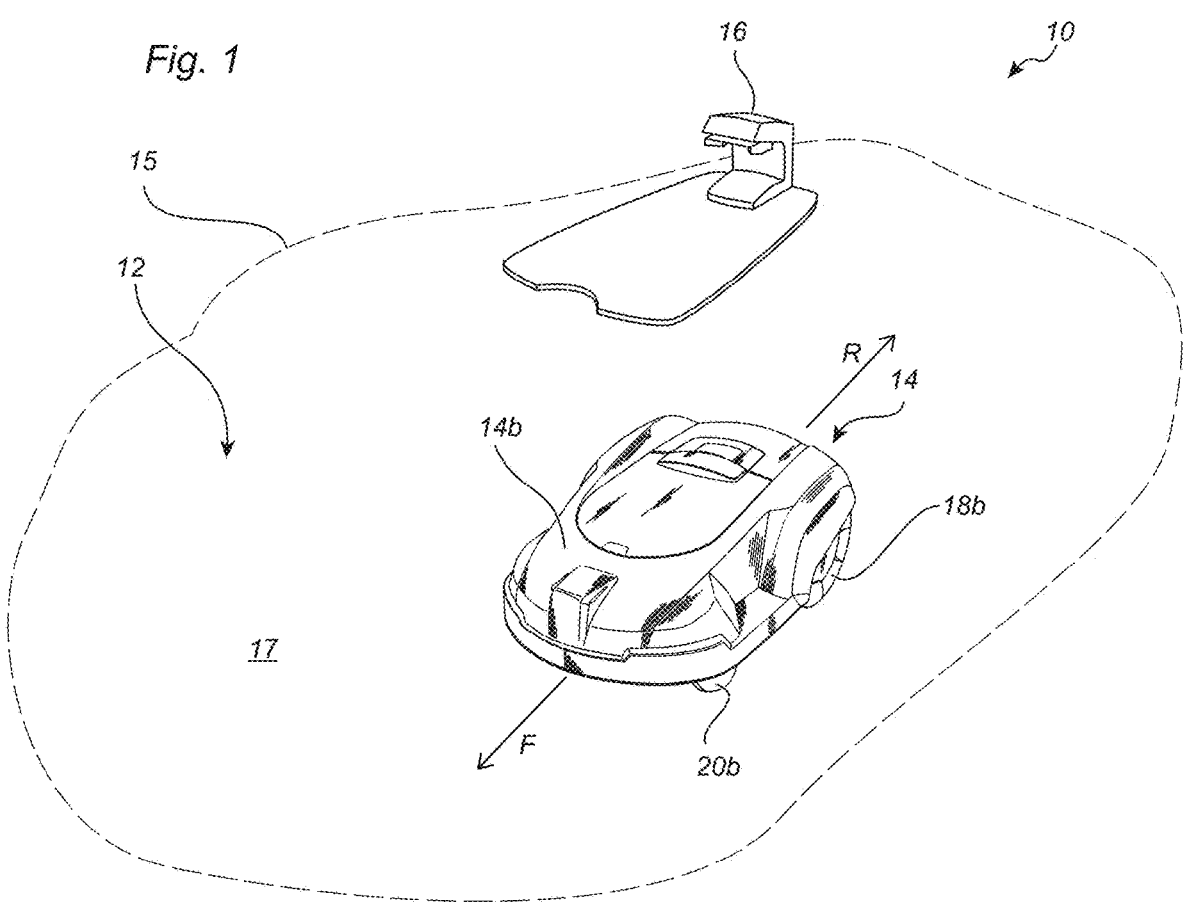
FIG. 1 is a perspective view of a robotic lawnmower system comprising a charging station and a robotic lawnmower operating on a grass surface.

FIG. 1 schematically illustrates an overview of a robotic tool system 10 configured to perform a task within a work area 12 such as a garden, a park or a golf course. The robotic tool system 10 comprises a battery-powered, self-propelled, and autonomously navigating robotic tool 14, along with a charging station 16 for charging a battery of the self-propelled robotic tool 14. The self-propelled robotic tool 14 is configured to drive on a grass surface 17 of the work area 12 while performing a task. As primarily described herein, the robotic tool 14 may be a robotic lawnmower, and for the sake of simplicity, it will be referred to as such in the following. However, the present disclosure may also be useful in connection with self-propelled robotic tools configured as golf ball collecting tools, agricultural machinery, mine clearance robots, or any other type of self-propelled robotic tools that are required to navigate across a grass surface to perform its task. In particular, the teachings herein may be of particular use in robotic tools configured to execute a task over an area to be treated, wherein a full or at least predetermined coverage of the area to be treated is desired. The work area 12 may be delimited by a boundary 15 which may be physical, i.e. defined by physical obstacles or a boundary cable carrying a boundary signal, or virtual, i.e. based on positions of boundary segments in a map used by the robotic lawnmower 14 for navigating.

Figure 2:
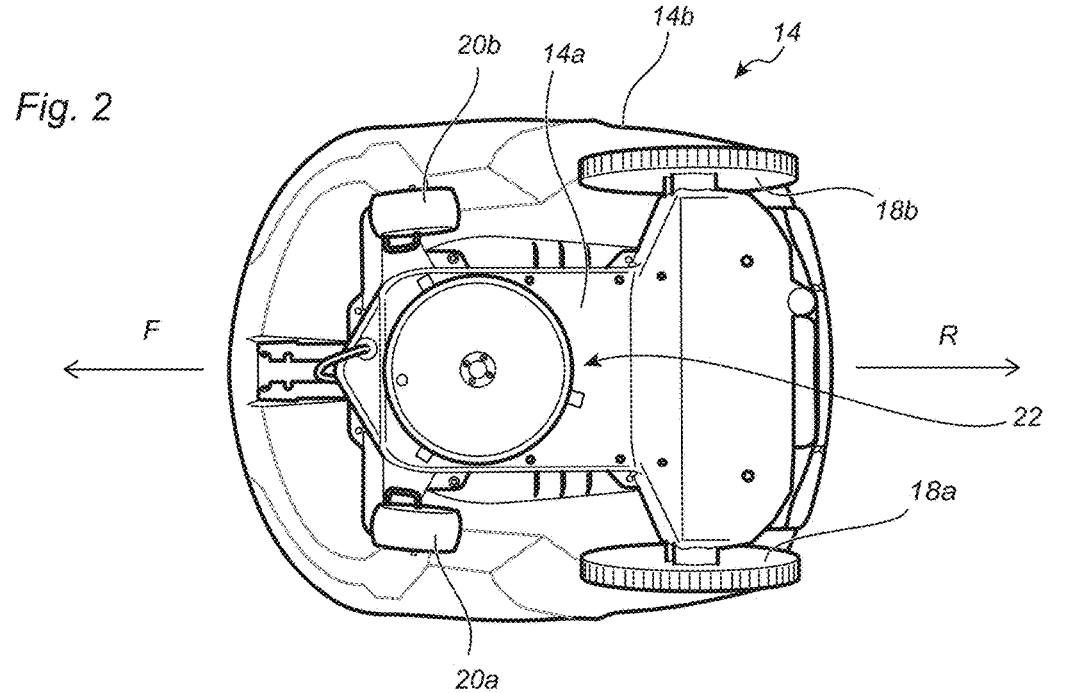
FIG. 2 is a bottom view of the robotic lawnmower of FIG. 1.

FIG. 2 illustrates the robotic lawnmower 14 from below. The robotic lawnmower 14 is provided with wheels 18a, 18b, 20a, 20b for moving within the work area 12. In the illustrated example, the robotic lawnmower 14 has two drive wheels 18a, 18b for propelling the robotic lawnmower 14, and two non-driven wheels 20a, 20b of caster type. Typically, the drive wheels 18a, 18b are connected to one or several motors, such an electric motor, either directly or via a transmission (not illustrated), for propelling the robotic lawnmower 14 across the grass surface 17 (FIG. 1). The robotic lawnmower 14 mainly propels itself in a forward direction F while cutting grass, even though it may be capable of occasionally reversing in a rearward direction R, for example in response to collisions with objects. Thereby, in the illustrated example, the drive wheels 18a-b are the rear wheels of the robotic lawnmower 14, and the non-driven wheels 20a-b are the front wheels of the robotic lawnmower 14. All wheels 18a, 18b, 20a, 20b are mounted to a single chassis 14a, which is configured as a rigid plastic shell enclosing electronic components of the robotic lawnmower 14. A cover 14b encloses an upper portion of the chassis 14a. A robotic tool also typically comprises at least one work implement configured to perform the task on the area to be treated. In the example of the robotic lawnmower 14, the work implement is a grass cutter 22, which may be rotatable about a vertical axis.

Figure 3:
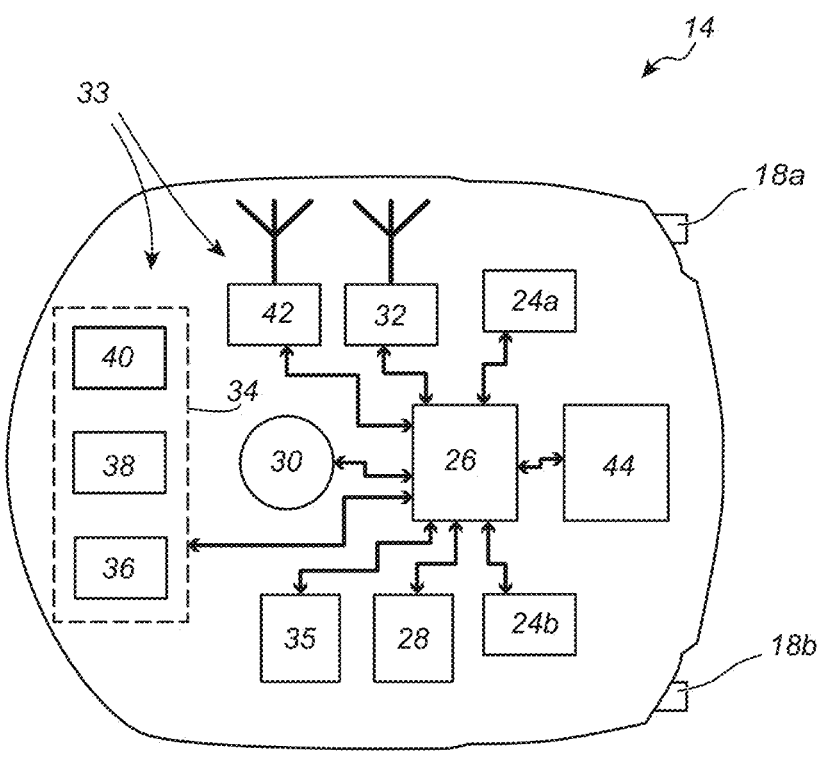
FIG. 3 is a block diagram of the robotic lawnmower of FIG. 1, and illustrates various functional blocks of the robotic lawnmower.

FIG. 3 illustrates functional blocks of the robotic lawnmower 14 seen from above. In the example of FIG. 3, a first drive wheel 18a is connected to a first electric wheel drive motor 24a, and a second drive wheel 18b is connected to a second electric wheel drive motor 24b. This allows for driving the first and second drive wheels 18a, 18b independently of one another, enabling e.g. steep turning of the robotic lawnmower 14. The robotic lawnmower 14 further comprises an electronic controller 26. The controller 26 is connected to sensors, actuators, and communication interfaces of various kinds, and may be implemented using a central processing unit, CPU, executing instructions stored on a memory 28 which may be external or internal to the controller 26. Needless to say, different combinations of general and application-specific integrated circuits may be used for the controller 26. Similarly, the memory 28 may be implemented using many different memory technologies, such as RAM, ROM etc. In general, the controller 26 is configured to read instructions from the memory 28 and execute these instructions, in view of different sensor signals, to control the operation of the robotic lawnmower 14. Typically, the controller 26 is configured to, based on the instructions, control the robotic lawnmower 14 to navigate the work area 12 and perform its task in an autonomous or semi-autonomous manner, i.e. with no, or only occasional, instructions from a human operator. The controller 26 also controls the operation of a cutter motor 30, which is configured to drive the grass cutter 22 (FIG. 2).

A wireless transceiver 32 is connected to the controller 26, and allows the controller 26 to communicate with the charging station 16 (FIG. 1) or any other device, such as a remote control or a smart phone (not shown). Accordingly, the controller 26 and/or memory 28 may alternatively be located in any other part of the robotic tool system 10, such as the charging station 16, which may autonomously direct the operation of the robotic lawnmower 14.

The robotic lawnmower 14 further comprises a movement detector 33 comprising an inertial measurement unit, IMU, 34. The IMU 34, which is rigidly connected to the chassis 14a (FIG. 2), comprises an accelerometer 36, a gyroscope 38, and a magnetometer 40. The IMU 34 detects relative movements of the robotic lawnmower 14, and assists the robotic lawnmower 14 to keep track of its movement within the area 12 to be mowed. In the illustrated example, the robotic lawnmower 14 also comprises a GNSS (Global Navigation Satellite System) receiver 42. The GNSS receiver is configured to receive navigation signals from navigation satellite systems such as GPS, and thereby enables absolute positioning within the work area; as such, the GNSS receiver may be seen as a part of the movement detector 34. The GNSS satellite signals may be supplemented by correction signals from one or several local beacons, or over a network, which may enable RTK (real-time kinematic) enhanced GNSS navigation. A local RTK beacon may e.g. be arranged in the charging station 16 (FIG. 1).

The robotic lawnmower 14 further comprises a boundary sensor 35 configured to detect the boundary 15 (FIG. 1) of the work area 12. The boundary sensor 35 may, for example, comprise an inductor configured to detect a magnetic field generated by electric current in a boundary cable.

The controller 26 controls the wheel drive motors 24a, 24b, thereby controlling the propulsion of the robotic lawnmower 14 within the work area 12 to be mowed. The wheel drive motors 24a, 24b may be stepper motors, allowing the controller 26 to precisely control the speed and rotation of the respective wheel drive motors 24a, 24b, and thereby also to keep track of the speed and distance travelled by the robotic lawnmower 14, as well as any turning angle of the robotic lawnmower 14 when the wheel drive motors 24a, 24b are operated at different speeds or in reverse directions.

The controller 26, movement detector 33, boundary sensor 35, transceiver 32, wheel drive motors 24a, 24b, and cutter motor 30 are powered by a battery 44, which is typically situated between the drive wheels 18a, 18b for a maximum of weight and traction on the drive wheels 18a, 18b. The robotic lawnmower 14 is configured to navigate to the charging station 16 (FIG. 1) on a regular basis, for example between work sessions and/or whenever the battery charge is running low, in order to dock with the charging station 16 for recharging the battery 44. The charging station 16 may be connected so as to receive power from the electric power grid.

The robotic lawnmower 14 (FIG. 3) is configured to perform a method of detecting slip of the drive wheels 18a, 18b. The method is implemented by computer program instructions stored in the memory 28 (FIG. 3). The controller 26 executes the instructions, while driving in e.g. the forward direction F on the grass surface 17 (FIG. 1) within the work area 12, and thereby causes the robotic lawnmower 14 to perform the method. The computer program instructions define a set of control process blocks illustrated in the flow chart of FIG. 4.

In control process block 401, the controller 26 determines a desired, nominal, heading and speed 401a of the robotic lawnmower 14. The desired heading and speed may be determined following any predetermined navigation algorithm defined by the computer program instructions in the memory 28, as well known in the art, and may also be based on further input from e.g. the boundary sensor 35 (FIG. 3) and/or the GNSS receiver 42 (FIG. 3).

In control process block 402, the controller 26 generates, based on the desired heading and speed, a first drive signal 402a for the first drive wheel 18a.

In control process block 403, the controller 26 generates a time-variant drive signal pattern overlay 403a.

In control process block 404, the controller 26 applies the time-variant drive signal pattern overlay 403a to the first drive signal 402a generated by control process block 402 to form a first wheel control signal 404a, which is used for operating the first wheel drive motor 24a such that the first drive wheel 18a moves in accordance with the first wheel control signal 404a. If the first drive wheel 18a does not slip, also the chassis 14a (FIG. 2), and accordingly, the movement detector 33 (FIG. 3) rigidly fixed thereto, moves in accordance with the first wheel control signal 404a. The resulting movement, if any, is represented by element 405 of FIG. 4.

In control process block 406, the controller 26 receives a movement signal 406a from the movement detector 33 (FIG. 3). The movement 405 links the first wheel control signal 404a to the movement signal 406a.

In control process block 407, the controller 26 analyzes the movement signal 406a to identify the time-variant drive signal pattern overlay 403a therein, and determines a slip state 407a based on the presence, if any, of the time-variant drive signal pattern overlay 403a in the movement signal 406a. If the magnitude of the time-variant drive signal pattern overlay 403a in the movement signal 406a exceeds a limit value, the controller 26 determines that the first drive wheel 18a (FIG. 1) of the robotic lawnmower 14 is not slipping; if not, it determines that the first drive wheel 18a of the robotic lawnmower 14 is slipping, at least to a certain extent. The controller 26 may also determine an extent to which the first drive wheel 18a is slipping, i.e. whether the first drive wheel 18a slips a lot or not so much, based on the extent to which the magnitude of the time-variant drive signal pattern overlay 403a in the movement signal 406a fails to reach the limit value.

Optionally, the slip detection may be supplemented by process block 408, in which the controller 26 determines whether the robotic lawnmower 14 (FIG. 1) has been lifted. A lift indication 408a is provided to the slip determination process block 407, and in control process block 407, the controller 26 may determine that the robotic lawnmower 14 is slipping is based on the further condition that no lift has been detected in process block 408.

Lift may be detected in control process block 408 by, for example, determining the rotation resistance of the first drive wheel 18a, and comparing it to a reference resistance value. If the rotation resistance is lower than the reference resistance value, the first drive wheel 18a spins freely in the air, and accordingly, the robotic lawnmower 14 has been lifted; otherwise, it has not been lifted. The rotation resistance of the first drive wheel 18a may be represented by the drive current required for operating the first wheel drive motor 24a.

Optionally, the method may be supplemented by process block 409, in which the controller 26, in response to having determined that the first drive wheel 18a is slipping, reverses the rotation direction of the first and/or second drive wheel 18a, 18b so as to attempt to turn the robotic lawnmower 14 away from any obstacle that may have caused slipping, or drive the robotic lawnmower 14 in the reverse direction R (FIG. 1).

The time-variant drive signal pattern overlay 403a may follow a predetermined pattern, and the identification in control process block 407 may be hard-coded to identify the predetermined pattern. Alternatively, the time-variant drive signal pattern overlay 403a may follow a pattern which is dynamically generated. Such a dynamically generated pattern may be forwarded to the control process block 407 such that the controller 26, in control process 407, may identify the time-variant drive signal pattern overlay 403a in the movement signal 406a by comparing the movement signal 406a to the time-variant drive signal pattern overlay 403a received directly from control process block 403 via the broken-line arrow.

Figure 5A:
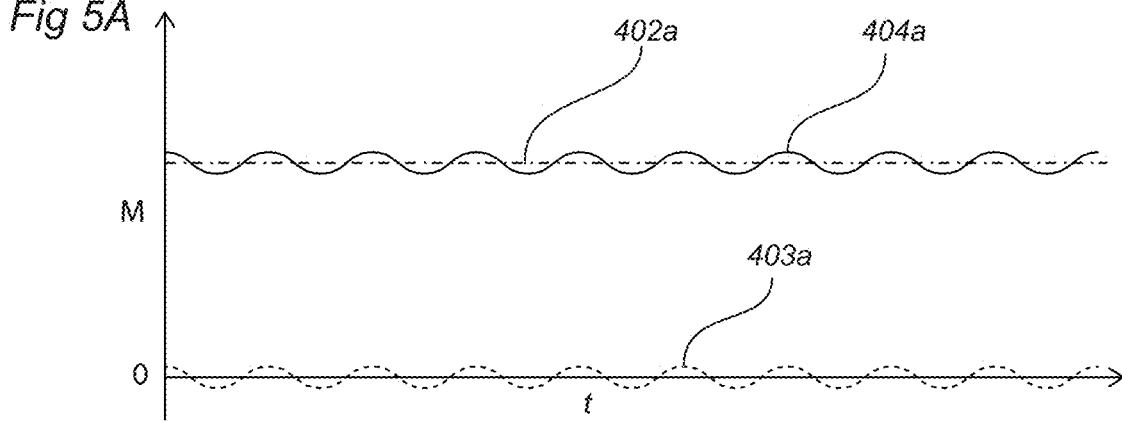
FIG. 5A is a diagram illustrating components of a first wheel control signal, for a first drive wheel of the robotic lawnmower of FIGS. 1-3, as a function of time.

The diagram of FIG. 5A illustrates the respective magnitudes M of the first drive signal 402a, the time-variant drive signal pattern overlay 403a and the first wheel control signal 404a according to a first example. In the example, the time-variant drive signal pattern overlay 403a is a sinusoidal signal as a function of time t. The time-variant drive signal pattern overlay 403a has alternatingly positive and negative values, such that the average value, integrated over a large period of time t, is close to 0. The example illustrates a situation where the first drive signal 402a represents a constant speed of the first drive wheel 18a. An exemplary suitable frequency of the sinusoidal time-variant drive signal pattern overlay 403a may be, e.g., between 0.1 Hz and 100 Hz. As illustrated, the magnitude of the time-variant drive signal pattern overlay 403a is only a small fraction of the magnitude of the first drive signal 402a.

Figure 5B:
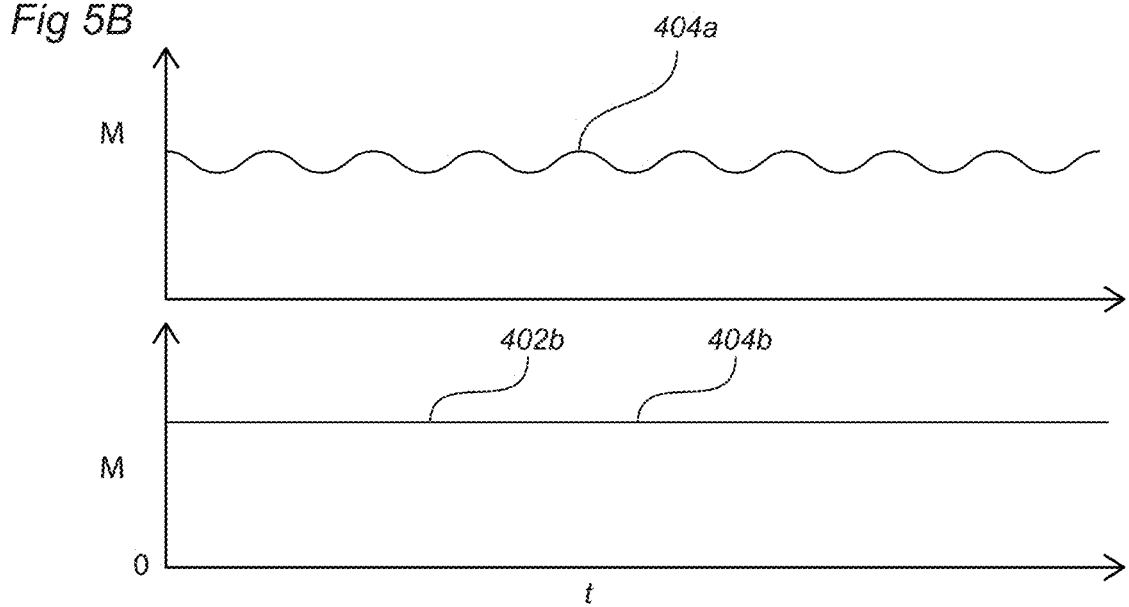
FIG. 5B is a diagram illustrating first and second wheel control signals, for first and second drive wheels of the robotic lawnmower of FIGS. 1-3, as a function of time.

The example continues with the diagram of FIG. 5B, which also illustrates the second wheel control signal 404b used for operating the second wheel drive motor 24b (FIG. 3). The example illustrates a situation where the second drive signal 402b is identical to the first drive signal 402a, i.e. the first and second drive signals 402a, 402b represent a nominal navigation along a straight line and at a constant speed. No time-variant drive signal pattern overlay is applied to the second drive signal 402b. Thereby, the second wheel control signal 404b is identical to the second drive signal 402b.

Figure 5C:
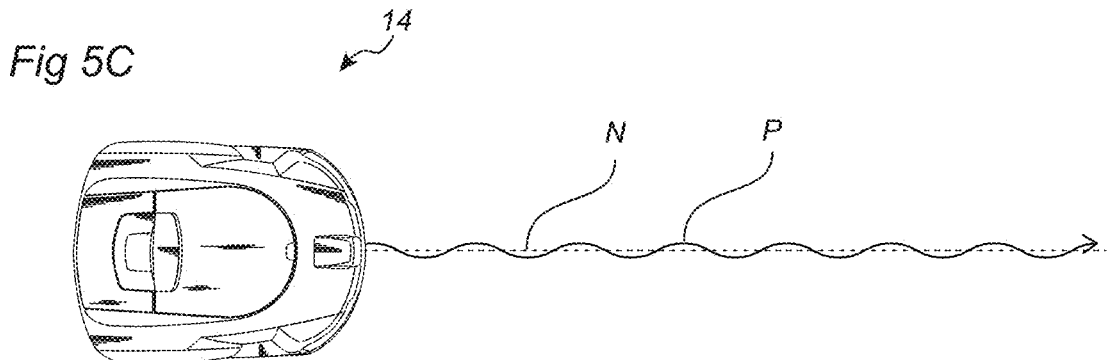
FIG. 5C is a top view of the robotic lawnmower of FIGS. 1-3, and illustrates the path followed by the robotic lawnmower in response to the wheel control signals of FIG. 5B.

FIG. 5C illustrates the resulting trajectory of the robotic lawnmower 14. Due to the sinusoidal character of the first wheel control signal 404a (FIG. 5B), the robotic lawnmower 14 follows a meandering path P by turning alternatingly to the left and to the right of an otherwise straight nominal path N. Please note that FIG. 5C exaggerates the meandering character of the path P for illustration purposes; in reality, the deviations of the path P from the nominal path N may be so small that they are not visible.

Figure 6:
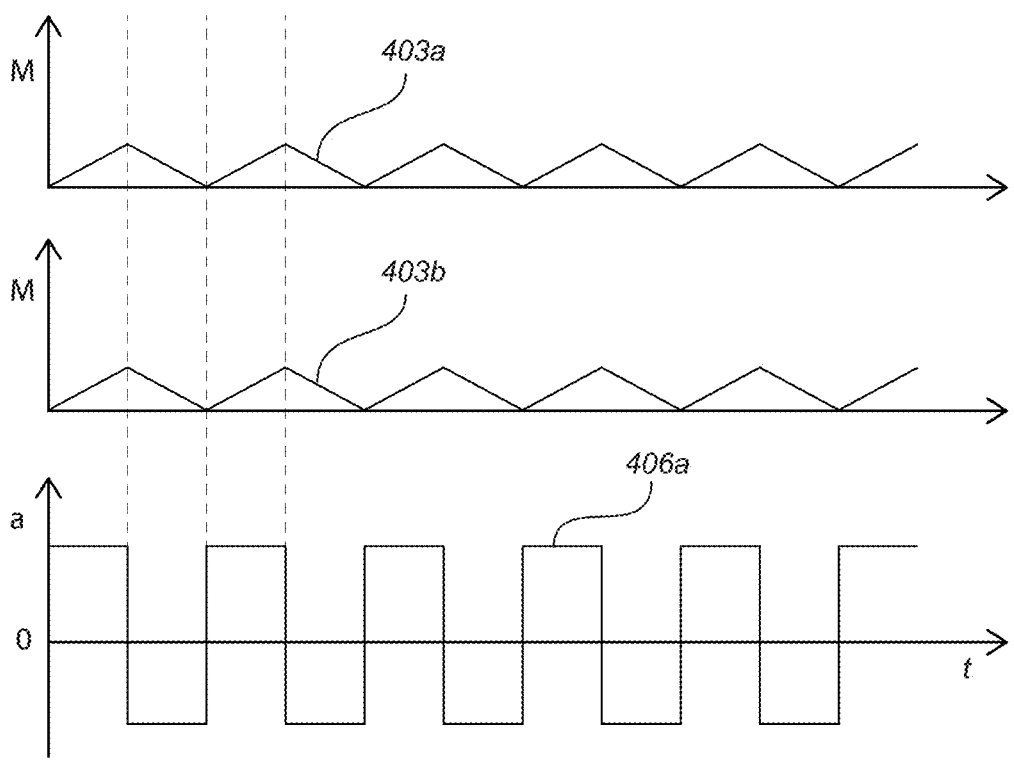
FIG. 6 is a diagram illustrating components of the first and second wheel control signals for the first and second drive wheels of the robotic lawnmower of FIGS. 1-3 according to a second embodiment, along with a corresponding movement detector signal resulting from movement caused by the first and second wheel control signals, as a function of time.

FIG. 6 illustrates a second exemplary pattern of a time-variant signal to be used as a drive signal pattern overlay. In the example of FIG. 6, the first time-variant drive signal pattern overlay 403a, to be applied to the first drive signal 402a (FIG. 4B) is identical to, and in phase with, the second time-variant drive signal pattern 403b to be applied to the second drive signal 402b (FIG. 4B). Thereby, the speed variations of the first and second drive wheels 18a, 18b, caused by the first and second time-variant drive signal pattern overlays 403a, 403b, are identical, such that the first and second time-variant drive signal pattern overlays 403a, 403b do not cause the robotic lawnmower 14 to leave its nominal path or follow a meandering path. Instead, the robotic lawnmower alternatingly accelerates and decelerates along its nominal path N (FIG. 5C). The respective magnitudes M of the first and second time-variant drive signal pattern overlays 403a, 403b follow a repetitive triangular function. Accordingly, the rotary speed of the first and second drive wheels 18a, 18b may follow a corresponding triangular function, and the movement signal 406a, which represents the acceleration a in the forward direction F (FIG. 1), may alternate between positive and negative values as illustrated in FIG. 6. Such acceleration variations may easily and readily be detected by e.g. the accelerometer 36.

Figure 4:
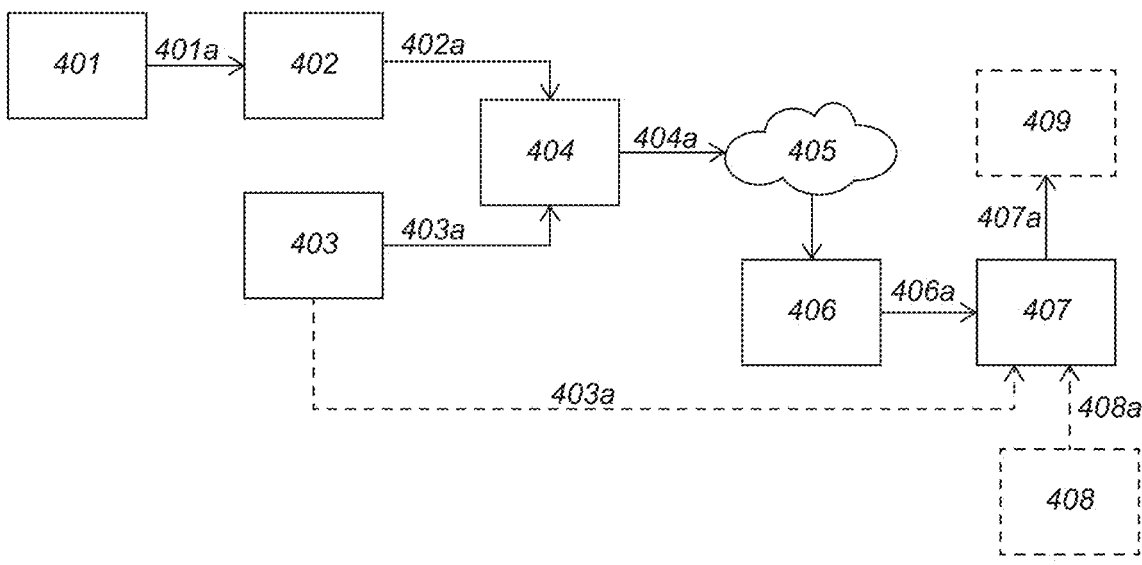
FIG. 4 is a flow chart illustrating control process blocks of a control process of the robotic lawnmower of FIGS. 1-3, the control process being adapted for detecting wheel slip of the robotic lawnmower.
Figure 7:
FIG. 7 is a perspective view of a compact disc holding a computer program implementing the method of FIG. 4.

FIG. 7 illustrates a computer-readable storage medium, embodied as a Compact Disc 99, having stored thereon a computer program product implementing the process blocks 401-409 of FIG. 4.

The invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality.

What is claimed is:

1. A method of detecting slip between a self-propelled robotic tool and a grass surface, comprising:
   driving on the grass surface;
   based on a desired heading and speed of the self-propelled robotic tool, generating a first drive signal for a first drive wheel of the self-propelled robotic tool;
   generating a first time-variant drive signal pattern overlay;
   applying said first time-variant drive signal pattern overlay to said first drive signal to form a first wheel control signal;
   operating a first drive wheel based on said first wheel control signal;
   receiving a movement signal from a movement detector; and
   determining a slip state based on an identification of said first time-variant drive signal pattern overlay in said movement signal.

2. The method according to claim 1, further comprising:
   based on said desired heading and speed of the self-propelled robotic tool, generating a second drive signal for a second drive wheel of the self-propelled robotic tool;
   applying a second time-variant drive signal pattern overlay to said second drive signal to form a second wheel control signal; and
   operating a second drive wheel based on said second wheel control signal.

3. The method according to claim 2, wherein a first time-variant signal pattern overlay and a second time variant signal pattern overlay comprise same time-variant drive signal pattern overlay applied to each of said first and second drive signals.

4. The method according to claim 1, wherein the first time-variant drive signal pattern overlay of the first wheel control signal is different from the second time-variant drive signal pattern overlay of any second wheel control signal.

5. The method according to claim 1, wherein a determination that the self-propelled robotic tool is slipping is based on a further condition that no lift has been detected.

6. The method according to claim 5, wherein determining a slip state further comprises:
   determining a drive wheel rotation resistance;
   comparing the drive wheel rotation resistance to a reference resistance value; and
   based on said comparison, determining that the self-propelled robotic tool has not been lifted.

7. The method according to claim 1, wherein said first time-variant drive signal pattern overlay alternates between positive and negative values.

8. The method according to claim 1, wherein said first time-variant drive signal pattern overlay varies with a frequency of between 0.1 Hz and 100 Hz.

9. The method according to claim 1, wherein a magnitude of the first time-variant drive signal pattern overlay is less than 20% of a magnitude of the first drive signal.

10. The method according to claim 1, wherein said movement detector comprises at least one of an accelerometer, a gyroscope, and a magnetometer.

11. The method according to claim 1, comprising:
   in response to having determined that the self-propelled robotic tool is slipping, reversing a rotation direction of said first drive wheel.

12. Data processing equipment comprising at least one processor and memory, configured to carry out the method of claim 1.

13. A self-propelled robotic tool comprising:

a first drive wheel;

a first wheel drive motor configured to rotate said first drive wheel;

a movement detector; and data processing equipment according to claim 12.

14. The self-propelled robotic tool of claim 13, further comprising a second drive wheel and, in addition to the first and second drive wheels, at least one further wheel configured to roll on the grass surface, wherein all of said first and second drive wheels and said at least one further wheel are carried by a single, rigid chassis.

15. The self-propelled robotic tool according to claim 13, wherein the self-propelled robotic tool has a weight of less than 9.0 kg.

16. A computer program product stored on a non-transitory computer readable storage medium comprising instructions which, when the program is executed on a processor, carries out the method according to claim 1.

* * * * *